United States Patent [19]
Hopperdietzel

[11] Patent Number: 5,083,820
[45] Date of Patent: Jan. 28, 1992

[54] PIPE COUPLING

[75] Inventor: Siegfried Hopperdietzel, Selb, Fed. Rep. of Germany

[73] Assignee: Rehau AG & Co., Rehau, Fed. Rep. of Germany

[21] Appl. No.: 456,687

[22] Filed: Dec. 28, 1989

[30] Foreign Application Priority Data

Dec. 28, 1988 [DE] Fed. Rep. of Germany ....... 3844045

[51] Int. Cl.$^5$ .............................................. F16L 37/08
[52] U.S. Cl. .................................... 285/305; 285/330; 285/351; 285/421
[58] Field of Search ............... 285/330, 351, 113, 423, 285/382, 305

[56] References Cited

U.S. PATENT DOCUMENTS

| 801,774 | 10/1905 | Devonshire | 285/423 X |
| 2,785,911 | 3/1957 | Kaufman | 285/919 X |
| 3,759,553 | 9/1973 | Carter | 285/423 X |
| 3,759,554 | 9/1973 | Carter | 285/423 X |
| 4,907,828 | 3/1990 | Chang | 285/351 X |

FOREIGN PATENT DOCUMENTS

| 6907610 | 9/1969 | Fed. Rep. of Germany . |
| 8805742 | 7/1988 | Fed. Rep. of Germany . |
| 2100818 | 1/1983 | United Kingdom ................. 285/423 |

Primary Examiner—Randolph A. Reese
Assistant Examiner—Heather Chun
Attorney, Agent, or Firm—Spencer & Frank

[57] ABSTRACT

A pipe coupling for driven-in pipes or the like includes a first pipe having a male coupling end, a first annular supporting element connected about the male coupling end, and a second pipe having a female coupling end adapted to receive the male coupling end. The female coupling end has a second annular supporting element connected to the exterior of the female coupling end.

7 Claims, 4 Drawing Sheets

PIPE COUPLING

CROSS-REFERENCE TO RELATED APPLICATION

The present disclosure relates to the subject matter disclosed in German Application No. P 38 44 045.8 of Dec. 28, 1988, the entire specification of which is incorporated herein by reference.

BACKGROUND OF THE INVENTION

The present invention relates to a pipe coupling for driven-in pipes or the like equipped with coupling regions at respective free ends of the individual pipes, with the coupling regions being formed by a reduction in the wall thickness from the exterior of the end of one pipe at the coupling region and from the interior of the end of another pipe at the coupling region, the reduction extending along the one pipe for a predetermined length and along the other pipe a distance which generally corresponds to the predetermined length.

The repair of untight—and consequently polluting—fluid conduits, such as waste water channels and the like, has become increasingly significant in recent times. Various sanitation methods have been developed for such repairs, with the repair of installed conduits by use of relatively short pipes—called "short pipe relining" in the art—being of especial significance. With this method, the pipes are forced—by pressing or drawing—into the defective pipelines without excavation of the defective pipelines by entry through the control shafts of an existing pipeline system. Since, however, such control shafts have inner dimensions—through which the pipes must pass—which are limited in size, the maximum installed length of the individual pipes is correspondingly limited. Therefore, the pipes which are employed have a relatively short length of about one meter.

Different methods were developed in the past for the drawing or pressing of such insertable pipeline sections into defective pipelines. For example, one solution provides for the insertion of short sections of insertable pipe which have a selected outer diameter into a portion of an existing pipeline which has an internal diameter larger than the selected outer diameter of the pipes. The resulting constriction of the cross section of the pipeline which would occur at the location of the insertable pipe due to its smaller inner diameter is, however, not acceptable in many cases. Therefore, methods are preferred in which the existing inner cross section of the installed pipeline is maintained.

In these preferred methods, the defective portion of the pipeline is broken up using a hydraulicly or mechanically operated apparatus, and the resulting fragments of the defective portion of the pipeline are then pressed outwardly into the area surrounding the pipeline so as to form a tunnel where the defective portion of the pipeline had been. In this way, a short insertable pipe section of the same diameter as the defective pipeline can be pushed into the above-described resulting tunnel. In this case it is necessary for the exterior of the short insertable pipe section to be as smooth as possible since any projections which extend beyond the outer circumference of the short insertable pipe section would make pressing or drawing the short insertable pipeline sections more difficult or even impossible.

The technical periodical entitled "Abwassertechnik," Volume 5, 1987, pages 22-24, describes pipes for subterranean, controlled construction of non-enterable cross sections—DN 250 to DN 800—as well as individual coupling arrangements. These couplings can be stressed axially using pressure. These are complicated coupling techniques which—insofar as they relate to pipes made of polymer materials—must be produced with the use of additional, accessory parts, and additional work is required to conform these additional parts to their respectively required dimensions. Moreover, for the pipe couplings produced according to this reference to withstand the pressure stresses that will occur, thick wall cross-sections are required, particularly in the region of the coupling, which thereby precludes economical fabrication of such pipe couplings.

Pipes made of polymer materials are generally produced in a continuous extrusion process and, during a finishing process, these pipes are formed to precise exterior dimensions. Due to the cooling of such pipes, initiated by the finishing process, tensile stresses develop along the interior pipe surface in a circumferential direction which, depending on the manufacturing process and the thickness of the pipe wall, may be considerably large. The continuously extruded pipes, which in this example are cooled from the outside in, are cut into pipes having lengths appropriate for their intended use and are subjected to further, special dimensioning work. This dimensioning work resides in the working of the pipe ends, for example by reducing the outer diameter of the pipe wall at its end to form a male coupling end, and by enlarging the internal diameter of a pipe or coupling end of another pipe to form a female end to receive the male end.

The pipe wall cross sections resulting from the above-described dimensioning work have the form of steps at the respective free ends of the pipes which substantially coincide in length and thickness. The male and female ends can be formed as complementary or mirror-image offset coupling regions of the two pipes, and the dimensioning can be effected, for example, by machining. However, the reduction in cross section of these free pipe ends removes the circumferential forces which would otherwise stabilize the pipe wall at these locations, and consequently the existing internal stresses of the remaining portions of the pipe wall cause deformations of these pipe ends. These deformations are particularly significant for pipes composed of polymer materials, e.g. high-density polyethylene, which have a low modulus of elasticity. In this case, it may become impossible to produce a pipe coupling having true dimensions. As a result of the above-mentioned deformations, the individual pipes can only be connected with one another—if a connection is possible at all—in a manner which does not permit the realization of a permanent seal.

Amorphous polymer materials, such as, for example, PVC-U, can be made free of stresses by tempering them to closely below the Vicat softening point. However, the remaining wall cross section in the coupling regions would no longer be sufficiently strong to absorb the pressure and tensile forces occurring during installation or connection with another pipe to form a coupling.

The tempering process which can be used for the above-mentioned PVC-U material is not feasible for partially crystalline materials such as high-density polyethylene. For such materials, the stresses in the pipe wall can be reduced only by heating the pipe to near the crystallite melting range, which cannot be accomplished in practice without irreparable deformation of the pipe or of the pipe ends at the locations where such heating occurs.

SUMMARY OF THE INVENTION

It is an object of the present invention to produce a pipe coupling for coupling the ends of two pipes and which can withstand the applied forces generated during installation, particularly in the coupling regions of the pipes, without damage to the pipe walls in the coupling regions.

It is another object of the invention to prevent deformations of coupling regions of pipe ends during the formation of the finished coupling ends of each pipe. The above and other objects are accomplished according to the invention in that a pipe coupling is provided for driven-in pipes or the like, and includes:

a first pipe having a male coupling end and a first annular supporting element connected about the male coupling end; and a second pipe having a female coupling end adapted to receive the male coupling end, and having a second annular supporting element connected to the interior of the female coupling end.

Since the stresses inherent in pipes having coupling ends as discussed in the foregoing cannot be reduced, or can be reduced only with difficulty, the negative effects of such stresses can be reduced or prevented in that, before mechanical working of the cross-sectional regions in the vicinity of the coupling regions of the pipes, annular supporting elements according to the invention are provided at each of the coupling ends. These annular supporting elements can be disposed on opposite sides of the pipe wall in these coupling regions either at or in the cross section of the remaining portions of the pipe walls. These annular supporting elements serve as reinforcements for the pipe walls and absorb the stresses which are released from the pipes during mechanical working of these pipes. Additionally, when the pipes are installed in a forward pressing or drawing-in procedure, these annular supporting elements serve to absorb the compressive and tensile forces generated in the coupling region between the two pipes.

According to another advantageous feature of the invention, the annular supporting elements are at least partly enclosed by and engaged with the material of the pipe wall. In particular, the annular supporting elements can be recessed into the respective outer or inner surfaces of the pipes such that the annular supporting elements are flush with the corresponding one of the surfaces in which they are recessed, thereby maintaining smoothness of the respective pipe surfaces. This smoothness is advantageous in that it reduces drag or friction on the outer surface during insertion of the pipes, and it reduces adverse effects on the fluid material flowing along the innermost surface inside the pipes.

In a further embodiment of the invention, at least one of the annular supporting elements is disposed in a groove-like opening at a free end of an insertable pipe coupling, in which the free end can be either a female or a male coupling end.

According to the invention, short pipes can be produced having coupling ends which retain their correct dimensions during mechanical working despite the stresses occurring in the pipe walls, such that two coupling ends which have engaging surfaces which are complementarily offset from each other can be coupled together without difficulty. If appropriate sealing elements are employed between the complementary or mirror-image offset coupling regions of the two pipes, a permanently tight pipe coupling can be produced. This arrangement has the additional advantage that, if the insertable pipe section is installed by pulling or pushing, the resulting compressive or tensile forces on the coupling region are also absorbed by the annular supporting elements. Therefore, the coupling ends in the coupling region are in effect stress relieved by the annular supporting elements and are therefore less subject to breakage or damage.

The invention will be described in greater detail below with reference to an embodiment which is illustrated in the drawings.

DETAILED DESCRIPTION OF THE PREFERRED EMBODIMENT

Figure 1:
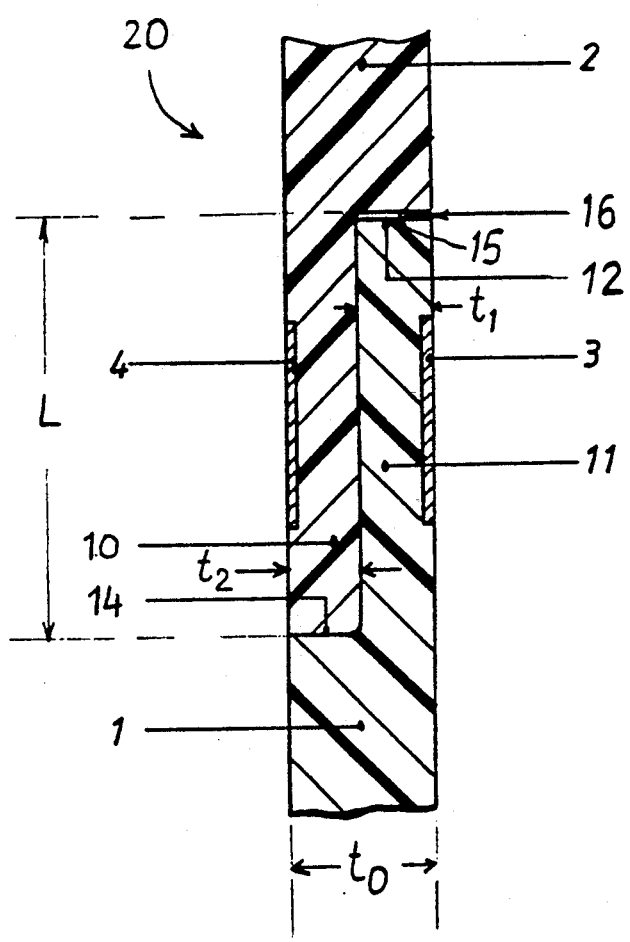
FIG. 1 is a longitudinal sectional view, partially broken away, of two pipe section ends forming a pipe coupling according to the invention.

A pipe coupling 20 is formed by engagement between a male coupling end 11 and a female coupling end 10, respectively, of a pair of pipes 1 and 2 as illustrated in longitudinal section in FIG. 1, wherein the pipes 1 and 2 are broken away at the top and at the bottom of the figure. The female coupling end 10 has a free end 14, and the male coupling end 11 has a free end 12. A tolerance gap 16 exists between the free end 12 of the male coupling end 11 and a facing surface 15 of the pipe 2. Only the left side of the pipe coupling 20 is shown in FIG. 1, the right side being omitted since it would be a mirror-image of the portion shown in FIG. 1. The pipes 1 and 2 are both tubular bodies having a main pipe wall thickness $t_0$.

The male coupling end 11 of the pipe 1 has a thickness $t_1$ which is reduced as compared with the larger, main pipe wall thickness $t_0$ of the pipe 1, and this reduced thickness $t_1$ can be produced by machining the original exterior surface of the pipe wall of the pipe 1 to reduce its outer diameter, and consequently the thickness, of the male coupling end 11. According to a preferred embodiment, the thickness $t_1$ of the male coupling end 11 is approximately one half of the original pipe wall thickness $t_0$. In a complementary manner, the female coupling end 10 of the pipe 2 has a thickness $t_2$ which is reduced as compared with the larger, original pipe wall thickness $t_0$ of the pipe 2, and this reduced thickness $t_2$ can be produced by machining the original interior surface of the pipe wall of the pipe 2 to enlarge its inner diameter, so as to reduce its thickness to produce the female coupling end 10. According to a preferred embodiment, the thickness $t_2$ of the female coupling end 10 is approximately one half of the original pipe wall thickness $t_0$.

According to a preferred embodiment, the female coupling end 10 has a length L, and the male coupling end 11 has a length which equals the length L less the width of the tolerance gap 16. The female and male coupling ends 10 and 11 additionally have the same thickness—that is, the thickness $t_1$ of the male coupling end 11 is substantially equal to the thickness $t_2$ of the female coupling end 10—so that, when assembled into the coupling 20, they produce a relatively smooth surface joint transition from the pipe 1 to the pipe 2 along both the outer and the inner surfaces of the coupling 20. In FIG. 1, the presence of the tolerance gap 16 at the free end 12 of the male coupling end 11 reduces the necessity for precision machining of the free end 12, and therefore allows relatively rough working of the free end 12.

Two annular supporting elements 3 and 4 are disposed on opposite sides of the male and female coupling ends 11 and 10. The annular supporting element 3 is received in a recess in the inner side of the male coupling end 11, while the annular supporting element 4 is received in a recess in the outer wall of the female coupling end 10. The annular supporting elements 3 and 4 are coaxially arranged in facing relationship as illustrated in the embodiment of FIG. 1. The annular supporting element 4 has a thickness sufficient to make it flush with the outermost surface of the female coupling end 10, and the annular supporting element 3 has a thickness sufficient to make it flush with the innermost surface of the male coupling end 11. Therefore, the annular supporting elements 3 and 4 do not disrupt the smooth surfaces of the respective male and female coupling ends 11 and 10. In this way, no cross-sectional variations in thickness occur in a direction radially outside or inside in the region of the annular supporting elements 3 and 4, which variations in thickness could constitute an impediment during insertion of the pipes 1 or 2 into a damaged pipeline or could hinder the flow of media through the interior of the pipes 1 or 2.

The pipes 1 and 2 are preferably made of polymer materials and can be produced in a continuous extrusion process. During a finishing process, the pipes 1 and 2 are preferably formed—for example, by machining—to have precise exterior dimensions. Due to the subsequent cooling of the pipes 1 and 2, tensile stresses develop along their interior pipe surfaces in a circumferential direction. Such tensile stresses may be relatively large, depending on the manufacturing process and the thickness $t_0$ of the respective pipe wall. The pipes 1 and 2 can therefore be formed as continuously extruded pipes, which in this example are cooled in a radial direction from the outside in, and then cut to lengths appropriate for their intended use. They are then subjected to further, special dimensioning work which resides in working of the male and female coupling ends 11 and 10 as discussed in the foregoing. This dimensioning is effected, for example, by machining. The reduction in cross section of the free coupling ends removes the forces which stabilize the pipe wall at these locations and the internal stresses of the remaining pipe wall regions would, in the absence of the annular supporting elements 3 and 4, lead to deformations of the male and female coupling ends 11 and 10. Such deformations are particularly significant for polymer materials having a low modulus of elasticity, e.g. high-density polyethylene which can be used to make the pipes 1 and 2, in which these stresses may be of several orders of magnitude, thereby making it virtually impossible to form coupling ends for forming a pipe coupling 20 as described above having true dimensions.

Figure 2:
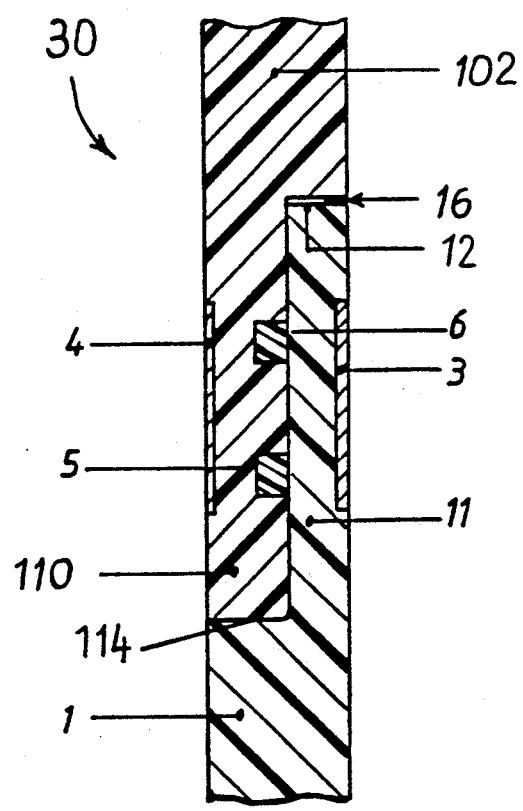
FIG. 2 is a longitudinal sectional view, partially broken away, of two pipe section ends forming a coupling having two circumferential sealing elements according to the invention.

A pipe coupling 30 according to another embodiment of the invention is shown in FIG. 2, where like numerals correspond to like parts in FIG. 1. The embodiment of FIG. 2 differs that of FIG. 1 in that a pipe 102 having a female coupling end 110 is provided. The female coupling end 110 has a free end 114 and has a pair of recesses (unnumbered) respectively receiving a pair of sealing rings 5 and 6. While two sealing rings 5 and 6 are shown, a single sealing ring 5 may be provided instead. Additionally, three or more sealing rings may be provided in corresponding recesses provided in the female coupling end 110, instead of the pair of sealing rings 5 and 6.

Figure 3:
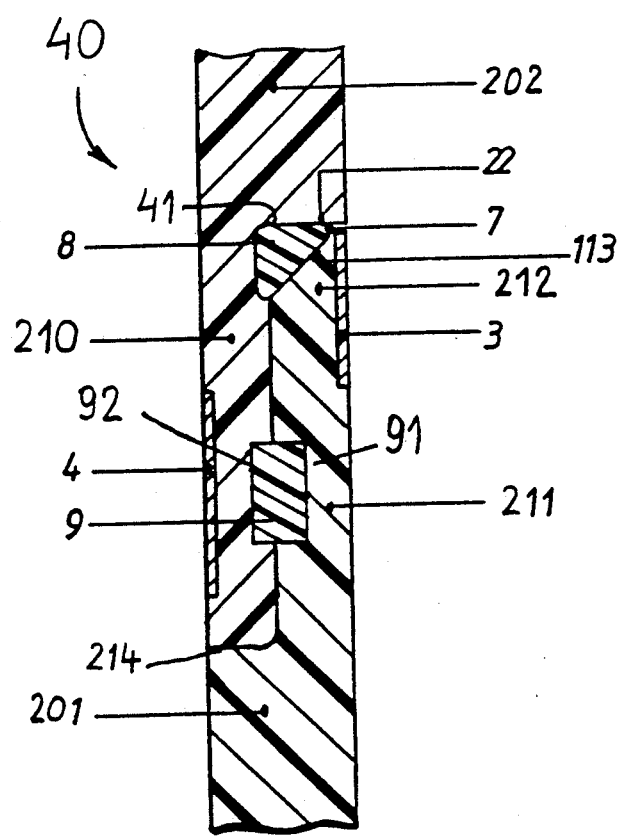
FIG. 3 is a longitudinal sectional view, partially broken away, of two pipe section ends forming a coupling having supporting elements which are longitudinally offset, a circumferential sealing element, and a pipe locking element.

A pipe coupling 40, referred to hereafter as a plug-in coupling 40, is formed by engagement between a female coupling end 210 and a male coupling end 211, respectively, of a pair of pipes 202 and 201 as illustrated in longitudinal section in FIG. 3, wherein the pipes 1 and 2 are broken away at the top and at the bottom of the figure. The female coupling end 211 has a free end 214, and the male coupling end 211 has a free end 212. The female coupling end 210 has an annular supporting element 4 corresponding to the annular supporting element 4 shown in FIG. 1. The male coupling end 211 has a annular supporting element 3 which is coaxial with but longitudinally offset from the annular supporting element 4. The annular supporting element 3 extends from the tip of the free end 212. The pipe 202 has a stop or abutment wall 22 along one side of a recessed portion 41 which receives a sealing ring 8. The free end 212 has an inwardly tapering sloped wall 113 which seals against the sealing ring 8. The recess 41 and the inwardly tapering sloped wall 113 together form a receiving chamber 7 in which the sealing ring 8 is disposed. The receiving chamber 7 as shown widens with distance toward the abutment wall 22. During the assembly of the pipes 202 and 201 to form the plug-in coupling 40, the sealing ring 8 is compressed by the inwardly tapering sloped wall 113 and the abutment face 22, and thereby forms a seal between the pipes 201 and 202.

A locking element 9 is disposed in opposed recesses 91 and 92—which together form a receiving chamber—which are respectively disposed in the male coupling end 211 and the female coupling end 210. The locking element 9 may be inserted into the receiving chamber formed by the opposed recesses 91 and 92 during assembly of the pipes 201 and 202 to form the plug-in coupling 40, and produces a longitudinal force lock in the resulting plug-in coupling 40. With the use of such a locking element 9, the connected individual pipes 1 and 2 can be pulled into their subsequent final seat, with locking element 9 absorbing the tensile stresses generated thereby.

Figure 4:
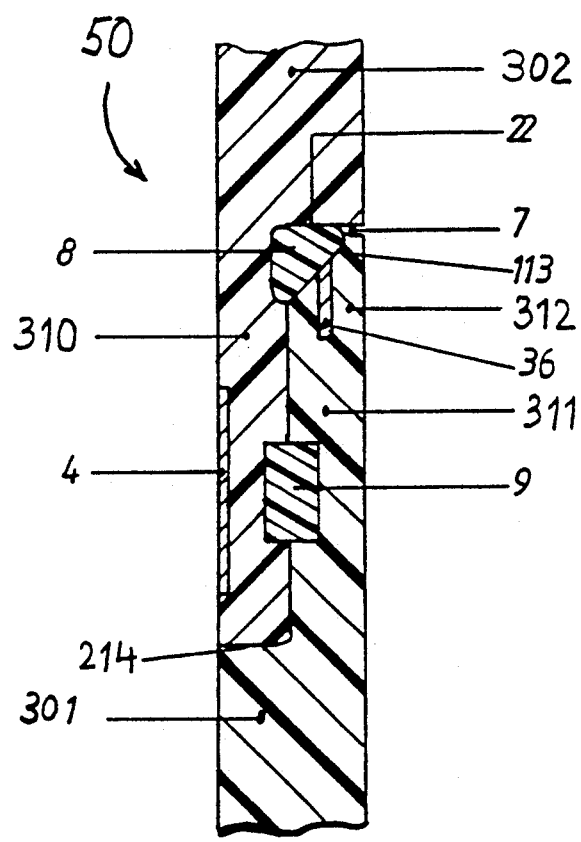
FIG. 4 is a view similar to that of FIG. 3, in which a supporting element is longitudinally received in an annular groove which is at one of the pipe section ends forming the coupling.

A pipe coupling 50 is shown in FIG. 4 which corresponds to that shown in FIG. 3 except that a pipe 301 has a male coupling end 311 supporting an annular supporting element 36 which is disposed in the inwardly tapering sloped wall 113, and the annular supporting element 3 is omitted. The female coupling end of pipe 301 bears reference numeral 310. Here, like numerals in FIG. 4 refer to like elements in FIG. 3. The annular supporting element 36 is coaxial with the annular supporting element 4 and is longitudinally offset therefrom.

In this embodiment, the annular supporting element 36 is sealed by the sealing ring 8 from media flowing inside the pipes 301 and 302, and is accordingly protected from, for example, attack by harmful or aggressive media flowing through the interior of the pipes 301 and 302. In this embodiment, the sealing ring 8 preferably serves to seal the annular supporting element 36 from the interior of the pipes 301 and 302 in a gas and fluid tight manner once it has been pressed into its final seat.

The bands 3, 4, and 36 of the various embodiments are preferably composed of a material which has a greater strength than the material composing the pipes 1 and 2, and in particular the bands 3, 4, and 36 can be composed of a metal such as brass or stainless steel, for example, or a composite material such as a reinforced material having graphite fibers embedded in a plastic matrix, among others. The sealing elements 5, 6, 8 and the locking member 9 may be of rigid polyvinyl chloride.

It will be understood that the above description of the present invention is susceptible to various modifications, changes and adaptations, and the same are intended to be comprehended within the meaning and range of equivalents of the appended claims.

What is claimed is:

1. A pipe coupling, comprising:
   a first pipe having a body portion which terminates in a stop and having a male end coupling portion which extends beyond the stop, the male end coupling portion terminating in a free end with a sloping region, the male end coupling portion having an annular slot at the sloping region of the free end;
   a second pipe having a body portion which terminates in a stop and having a female end coupling portion which extends beyond the stop, the female end coupling portion being adapted to receive the male end coupling portion;
   a first annular supporting element which is disposed in the slot in the male end coupling portion of the first pipe;
   a second annular supporting element which engages the second pipe around the female end coupling portion thereof;
   a sealing ring engaging the stop of the second pipe, the sealing ring additionally engaging the sloping region at the free end of the male end coupling portion of the first pipe and covering the slot therein; and
   means for retaining the male end coupling portion in the female end coupling portion.

2. A pipe coupling as claimed in claim 1, wherein the male end coupling portion and the female end coupling portion have approximately the same length and wall thickness.

3. A pipe coupling as claimed in claim 1, wherein the male end coupling portion has an outer surface with a recess and the female end coupling portion has an inner surface with a recess, and wherein the means for retaining comprises a locking element which extends into the recesses of both the male end coupling portion and the female end coupling portion to lock the male end coupling portion and the female end coupling portion together.

4. A pipe coupling as claimed in claim 1, wherein the first and second pipes are made of extruded polymer material, and wherein the first and second annular supporting elements are made of metal.

5. A pipe coupling, comprising:
   a first pipe having a body portion which terminates in a stop and having a male end coupling portion which extends beyond the stop, the male end coupling portion terminating in a free end, the male end coupling portion having an annular slot at the free end;
   a second pipe having a body portion which terminates in a stop and having a female end coupling portion which extends beyond the stop, the female end coupling portion being adapted to received the male end coupling portion;
   a first annular supporting element which is disposed in the slot in the male end coupling portion of the first pipe;
   a second annular supporting element which engages the second pipe around the female end coupling portion thereof;
   a sealing ring engaging the stop of the second pipe, the sealing ring additionally engaging the free end of the male end coupling portion of the first pipe and covering the slot therein; and
   means for retaining the male end coupling portion in the female end coupling portion.

6. A pipe coupling as claimed in claim 5, wherein the male end coupling portion has an outer surface with a recess and the female end coupling portion has an inner surface with a recess, and wherein the means for retaining comprises a locking element which extends into the recesses of both the male end coupling portion and the female end coupling portion to lock the male end coupling portion and female end coupling portion together.

7. A pipe coupling as claimed in claim 5, wherein the first and second pipes are made of extruded polymer material, and wherein the first and second annular supporting elements are made of metal.

* * * * *